Feb. 19, 1952 M. J. RYAN 2,586,386

FLEXIBLE RULE

Filed May 13, 1949

INVENTOR.
MARK J. RYAN,
BY Allen & Allen
ATTORNEYS.

Patented Feb. 19, 1952

2,586,386

UNITED STATES PATENT OFFICE 2,586,386

FLEXIBLE RULE

Mark J. Ryan, Cincinnati, Ohio

Application May 13, 1949, Serial No. 93,165

13 Claims. (Cl. 242—84.9)

Figure 2:
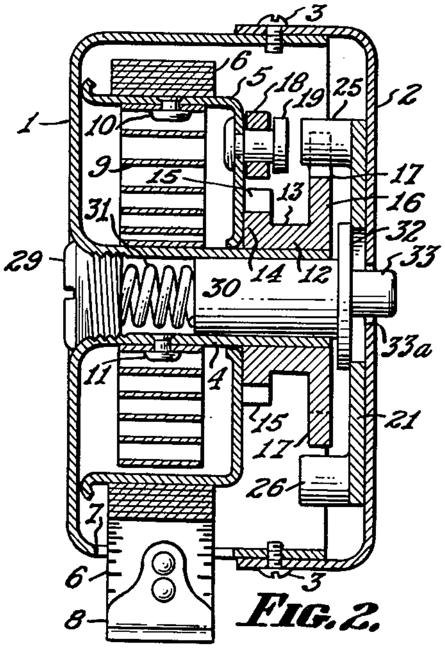

My invention has to do with flexible rules, and more particularly with flexible rules of the class in which the rule or tape is wound on a reel mounted within a casing and in which means are provided to rewind the tape once it has been withdrawn. The means for rewinding the tape generally comprises a spiral spring fastened to the reel so that it will be wound as the reel is rotated in one direction. Thus, as the tape is withdrawn it causes the reel to rotate and the reel in turn winds the spring. When the tape is released the spring rotates the reel in the opposite direction and draws the tape back into the casing. It is customary to provide a ratchet wheel co-operating with the reel to hold the tape in withdrawn position. The ratchet permits the reel to rotate freely as the tape is pulled from the reel, but as soon as the pull on the tape is released and the reel starts to rewind under the influence of the spring, the ratchet teeth are engaged by one or more pawls carried on the reel and the latter is held against rotation. The tape is thereby held with the desired length withdrawn from the casing. To release the tape and permit it to be rewound, it is necessary to disengage the ratchet; and a release button is provided which displaces the ratchet sufficiently to permit the reel to rewind.

Flexible rules of the character just described are known to the art and have been in general use for a number of years. The prior art devices have been found objectionable, however, in that the rewind speed cannot be controlled and the tape has a tendency to lash back into the casing with considerable speed. The tape is topped only when the clip or other retaining means on the free end of the tape comes in contact with the casing. The lashing about of the tape and the speed at which it snaps back results in the eventual shearing off of the rivets holding the clip or the fracture of the tape itself. As a result, the rule has to be repaired or discarded. Too, the lashing tape can cause serious injury to the user, especially if it comes within range of the user's face. This is particularly true of rules having metallic tapes, for the sharp edges of these tapes are extremely dangerous when thrashed about. This defect in flexible rules has been long recognized, but the only solution heretofore known was to control the retracting speed by allowing the tape to be drawn between two fingers on one hand while holding the release button with the other. This involves a two-handed operation and, of course, is not a positive way in which to protect against the tape snapping back. Should the user fail to hold the tape properly or should the release button be pressed by accident, the tape will still lash back with possible injury to the user.

It is the primary object of my invention to provide a flexible rule of the general type just described in which the tape is rewound at a controlled rate of speed, and consequently it is an object of my invention to provide in a rule means which will control the speed at which the tape is drawn back within the casing when the release button is pressed.

It is a further object of my invention to provide means to control the speed of the retracting tape which will be positive in action and which may be incorporated in the casing of the rule without appreciably increasing its size or decreasing its utility and operability.

Figure 1:
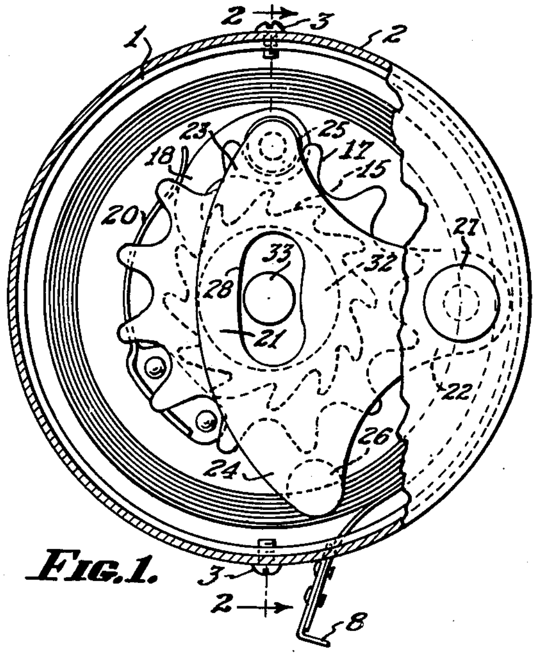
Figure 6:
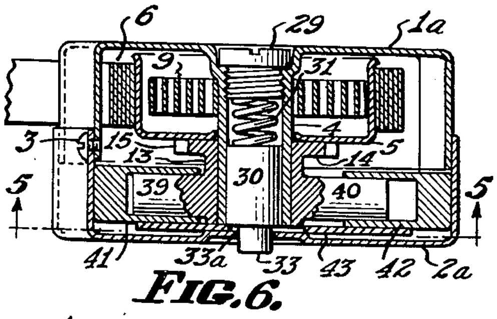
Figure 5:
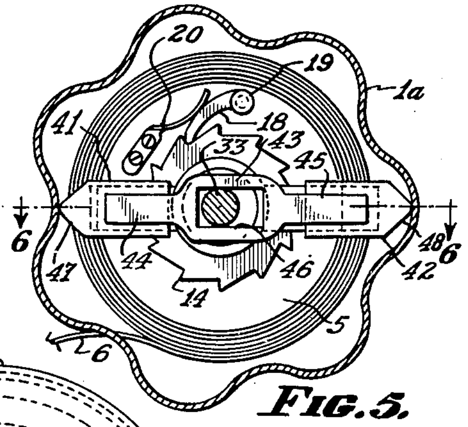
Figure 4:
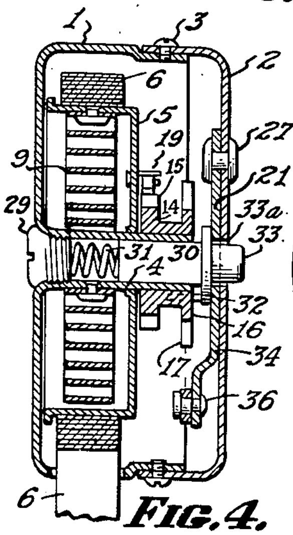
Figure 3:
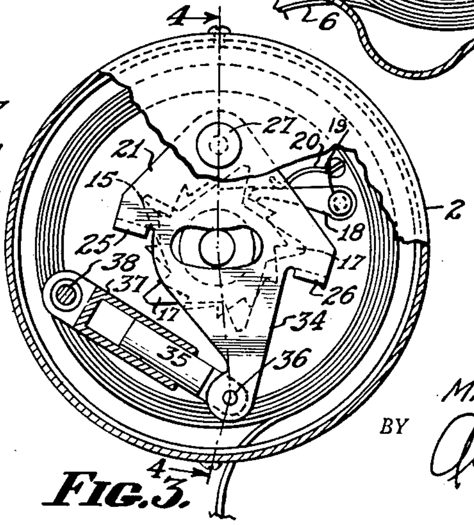

These and other objects of my invention which will be set forth hereinafter or will be apparent to one skilled in the art upon reading these specifications, I attain by those procedures and in those constructions and arrangements of parts of which I shall now describe certain exemplary embodiments. Reference is made to the accompanying drawing wherein:

Figure 1 is a front elevation of my flexible rule with the casing broken away to show the arrangement of parts, Figure 2 is a sectional view taken along line 2—2 of Figure 1, Figure 3 is a front elevation of an alternative construction shown with the casing broken away to illustrate the arrangement of the parts, Figure 4 is a sectional view taken along line 4—4 of Figure 3, Figure 5 is a front sectional elevation of still another modification of my invention, and Figure 6 is a sectional view taken along line 6—6 of Figure 5.

Referring to the drawings, in Figures 1 and 2 I have shown a casing 1 having a cover element 2 fastened to it by means of screws 3. While screws have been illustrated, it will be understood that pins, mating indentations or other fastening means could be employed. Preferably, the cover element should be detachable so that access may be had to the interior of the casing.

The casing 1 has a centrally disposed hollow annular extension 4 extending perpendicularly from the base of the casing and terminating short of the cover element. In the embodiment illustrated the extension is formed as an integral part of the casing, but it will be understood that it could be formed separately if so desired and then fixed to the shaft.

Within the casing the reel 5 is journaled on the extension 4, and wound around the reel is the flexible tape 6. The inner end of the tape 6 is fastened to the reel by any suitable fastening means and the outer or free end extends thru the opening 7 in the casing and has a clip 8 attached to it. The clip prevents the tape from being drawn completely within the casing and also provides a convenient tab with which to grasp the tape. The clip may be angular in configuration, as illustrated, or it may be in the nature of a loop or a hook; the only requisite being that it is of sufficient dimensions to prevent the end of the tape from passing thru the opening 7 in the casing. Fixed within the reel 5 and about the shaft 4 is the spiral spring 9 having its outer end fastened to the reel by means of stud 10 and its inner end fastened to the extension 4 by means of stud 11. Stud 10 may also be the means whereby the tape 6 is fastened to the reel.

The extension 4 also has journaled to it the operating element 12. The operating element comprises the annular shank 13 bounded at one end by the ratchet wheel 14 having ratchet teeth 15 and at the other by escapement wheel 16 having escapement teeth 17. This member is preferably formed as a single element, although if desired it may be made up of individual parts suitably connected together for joint movement about the extension, as will be explained more fully hereinafter. A pawl 18 is movably attached to the reel 5 by means of the bearing 19; and a leaf-spring 20 also attached to the reel 5 maintains the pawl in contact with the ratchet teeth 15. The ratchet teeth are biased so as to permit the pawl to slide over them as the reel is rotated in a clockwise direction (see Figure 1). When the reel is rotated in a counter-clockwise direction, as on rewind, the pawl will be engaged by the nearest one of the ratchet teeth and the reel thereby held against rotation relative to the ratchet and hence to the operating element.

An escapement rocker 21 comprising a trunk or leg 22 and arms 23 and 24 having inwardly extending detents 25 and 26 controls the motion of the escapement wheel 16. The escapement rocker is pivotally fixed to the cover member 2 by means of the bearing 27 passing through the rocker leg 22. The detents 25 and 26 are positioned to follow the teeth 17 of escapement wheel 16 and permit a tooth to escape with each oscillation of the rocker. An elongated opening 28 is provided in the body of the rocker 21 to permit a release button to pass through it. The opening 28 is of sufficient dimensions to permit the escapement rocker to oscillate without interference.

The hollow extension 4 extending within the casing is closed at one end by the plug 29 which screws into the extension. If, as mentioned earlier herein, the extension 4 is formed separately and fixed to the casing as by welding or brazing, the plug can be eliminated since the casing itself would serve as the plug. A plunger 30 fits into the other end of the extension and is biased outwardly by means of compression spring 31 lying between the plunger 30 and the plug 29. The plunger 30 carries at its outer end the collar 32 and the release button 33, the latter extending outwardly through an opening 33a in the cover member 2. The spring 31 normally urges the plunger 30 and collar 32 into engagement with the inner surface of the escapement rocker 21, and the compression of the spring 31 is sufficient to hold the escapement rocker against movement.

In the construction just described when the tape 6 is withdrawn from the casing and the reel 5 rotated so as to wind the spiral spring 9, the pawl 18 simply rides over the ratchet teeth and affords no substantial drag on the withdrawal of the tape, the operating element being held against rotation by the rocker. When the tape is released the reel will tend to rewind under the influence of the spiral spring, but the pawl will engage one of the ratchet teeth to prevent the rewind movement. The ratchet wheel, it will be remembered, is integral with the escapement wheel and the latter is held against movement by the detents 25 and 26 of the escapement rocker. The escapement rocker in turn is held against oscillation by the collar 32 of the plunger 30 which is urged against it under the influence of compression spring 31. Consequently the reel cannot rewind and is held in fixed position with the tape withdrawn to the desired length. When, however, the release button 33 is depressed and the escapement rocker freed for movement, the tape will be rewound. The pawl 18 will drive the ratchet wheel in a counter-clockwise direction (Figure 1) and this in turn drives the escapement wheel 16, the speed of rotation of the reel being controlled by the rapidity of the oscillating movement of the rocker as the detents 25 and 26 ride over the teeth 17 of the escapement wheel. Thus the tape is drawn into the casing at a controlled speed and does not whip about.

In Figures 3 and 4 I have shown a modification of my rule in which the rapidity of the rewind movement is further limited by means of a dash pot acting in conjunction with the escapement rocker. This modification finds particular utility in larger rules wherein the spiral spring must be more powerful and hence creates a greater force acting to rewind the tape. Unless the additional means were provided, the escapement rocker might oscillate too rapidly to be effective.

In this embodiment the parts corresponding to those of Figures 1 and 2 have been given like reference numerals to avoid duplication of description. All of the parts present in the embodiment of Figures 1 and 2 are present in the modification of Figures 3 and 4 and vary only in size and proportion with the exception of the escapement rocker 21. In this embodiment the escapement rocker carries a depending arm 34 extending beyond the detents 25 and 26 and having a piston 35 pivotally connected to its end by pivot 36. A cylinder member 37 is fitted about the piston and has its free end pivotally connected to the cover member 2 by means of pivot 38. The cylinder member is loosely fitted over the piston so that as the piston is driven into the cylinder, air may escape between the two elements. If the clearance between the piston and the cylinder is not sufficiently great to allow the air to escape as it is compressed, small holes or ports (not shown) may be provided in the walls of the cylinder, as will be readily understood.

The operation of this modification will be similar to that described in connection with the rule of Figures 1 and 2, excepting that the dash pot will decrease the rapidity with which the escapement rocker may oscillate by offering resistance to the movement of the depending arm 34.

In the modification illustrated in Figures 5 and 6 I have eliminated entirely the oscillating rocker and substituted in its place a pair of diametrically opposite reciprocating dash pots which alone serve to retard the rewinding speed of the reel. Again, where possible, like parts have been given like reference numerals.

In this embodiment the wall of the casing 1a is scalloped as is the cover 2a which is attached to the casing by the screws 3. As an alternative construction the casing 1a may be cylindrical as before, with only the outermost portion of the cover scalloped. The purpose of scalloping the casing in this manner is to provide a cam surface having protuberances and depressions which will cause the dash pots to reciprocate, as will become apparent hereinafter. The protuberances and depressions of the cam surface must, however, be diametrically oppositely directed; that is, a protuberance must always lie opposite a depression in order to assure proper reciprocating movement of the dash pots.

The operating member in this embodiment consists of an annular shank 13 bounded on one end by the ratchet wheel 14 as before, and at the other by a pair of diametrically opposed pistons 39 and 40. Cylinder members 41 and 42 are loosely fitted over the pistons 39 and 40 respectively and connected together by means of connector 43. The connector 43 comprises a body portion having outwardly extending arms 44 and 45 to which the cylinders are fixed. The cylinders may be welded or brazed directly to the connector arms or they may be pivotally attached if desired. The connector positions the cylinders relative to the pistons and causes them to move as a unit. Thus, the cylinders reciprocate on the pistons rather than the pistons reciprocating relative to the cylinders. The connector has an elongated opening 46 in its center to permit it to move back and forth without interfering with the release button 33 passing through it. In this embodiment the collar on the plunger 30 may be omitted and the end of the plunger 30 placed in direct contact with the connector 43.

The outer ends of the cylinders are tapered as at 47 and 48 to provide cam following surfaces to ride against the inner surface of the configured casing. As can be best seen in Figure 5, the cylinders are positioned so that the tapered end 47 of cylinder 41 rides on an innermost or depressed portion of the casing as the tapered end 48 of the opposite cylinder 42 is riding on an outermost portion or protuberance of the casing. As the cylinders are moved in a counter-clockwise direction, as on rewind, it will be seen that their positions will be reversed; the cylinder 41 will be moved to the outermost position and the cylinder 42 will be moved to the innermost position.

As in the previous embodiments the plunger 30 is urged outwardly under the influence of spring 31 and frictionally engages the connector 43 holding it against movement. This of course prevents the cylinders from moving relative to the casing and in turn holds the operating element against movement.

When the tape 6 is withdrawn from the casing the pawl 18 rides over the ratchet teeth and permits the reel 5 to rotate clockwise, the operating element remaining fixed. When the tape is released the pawl engages one of the ratchet teeth thereby preventing movement of the reel. When, however, the release button is pressed and the connector and the operating element released for movement, the ratchet wheel will be moved under the influence of the pawl thereby causing the pistons to rotate carrying with them the cylinders which will be reciprocated as they slide along the inner, configured surface of the casing.

The retarding or braking effect of the reciprocating dash pots construction is two-fold. First, the speed at which the operating element rotates and hence the speed at which the reel rewinds will depend upon the amount of resistance offered to the reciprocating motion of the cylinders which in turn depends on the amount of air permitted to leak past the pistons. Secondly, the friction due to the contact between the ends of the cylinders and the casing creates an additional drag which tends to slow down the rotation of the operating element. A salient feature of this construction lies in the fact that the retarding effect of the dash pots will be at a maximum at a high speed and at an absolute minimum at low speed, and this of course is highly desirable since the retarding effect will be proportional to the force which is to be overcome.

Modifications may be made in my invention without departing from the spirit of it. Having thus described my invention in an exemplary embodiment what I claim as new and desire to secure by Letters Patent is:

1. In a flexible rule, a casing, a hollow tubular extension extending within said casing, a reel journaled on said extension and having a flexible tape wound thereon, an operating element journaled axially of said reel and operatively connected therewith, spring means to retract said tape by revolving said reel, automatically acting retarding means operatively connected to said operating element, means for operatively connecting said reel and said operating element when said reel is under the influence of said spring means, whereby the rewind speed of said tape may be controlled, and release means for normally holding said retarding means against movement, said release means being displaceable to release said retarding means for movement.

2. The structure of claim 1 wherein said release means comprises a spring biased plunger for frictional engagement with said retarding means whereby said last mentioned means may be held against movement, said spring biased plunger being displaceable to free said retarding means for movement.

3. The structure of claim 2 in which said operating element comprises an annular shank bounded on one end by a ratchet wheel and on the other by an escapement wheel, and wherein said means operatively connecting said reel and said operating element comprises a pawl carried on said reel and held in contact with said ratchet wheel.

4. The structure of claim 2 in which said operating element comprises an annular shank bounded on one end by a ratchet wheel and on the other by an escapement wheel, and wherein said means operatively connecting said reel and said operating element comprises a pawl carried on said reel and held in contact with said ratchet wheel, and wherein said spring biased plunger is fitted within said hollow extension and extends therefrom, the extending end of said plunger normally being in frictional engagement with said retarding means, and a release button on said plunger for moving it out of engagement with said retarding means.

5. The structure of claim 4 wherein said retarding means comprises an escapement rocker pivotally connected to said casing, said escapement rocker having inwardly extending detents for operative engagement with the escapement wheel of said operating element.

6. The structure of claim 4 wherein said retarding means comprises an escapement rocker pivotally connected to said casing, said escapement rocker having inwardly extending detents for operative engagement with the escapement wheel of said operating element, said escapement rocker having an extending arm, and a dash pot pivotally connected to the free end of said arm and to said casing.

7. The structure of claim 1 wherein said operating element comprises an annular shank bounded at one end by a ratchet wheel and at the other by a pair of oppositely directed pistons extending outwardly therefrom, said retarding means comprising a pair of cylinders fitted over said pistons and connected together for joint movement, said casing being of scalloped configuration in the path of travel of said cylinders.

8. In combination in a flexible rule, a casing, a shaft within said casing, a reel journaled on said shaft and having a flexible tape wound thereon, spring means for retracting said tape, speed control means for automatically controlling the retracting speed of said tape, and a pawl and ratchet drive from said reel to said speed control means, said drive being effective only during rewind movement of said reel, said speed control means comprising a pair of coacting members, the first of said members adapted to rotate with said reel, and the second member being adapted to retard the movement of said first mentioned member, and means for preventing the operation of said speed control means, said means being disengageable to permit the operation of said speed control means.

9. In combination in a flexible rule, a casing, a shaft within said casing, a reel journaled on said shaft and having a flexible tape wound thereon, spring means for retracting said tape, and speed control mechanism for automatically controlling the retracting speed of said tape, said mechanism being operatively connected to said reel and comprising a tooth member and a coacting member, said tooth member arranged to impart reversing motion to said coacting member, said coacting member being adapted to retard the retracting speed of said reel, and means for preventing the operation of said speed control mechanism, said means being displaceable to permit the operation of said speed control mechanism when desired.

10. In a flexible rule of the class described, a casing, a flexible tape wound within said casing, retracting means to retract said tape, automatically acting retarding means to control the retracting speed of said tape, said retarding means comprising an escapement rocker pivotally connected to said casing, an operating element operatively connecting the said tape and said retarding means, and release means for normally preventing retracting movement of said tape, said release means being displaceable to free said tape for movement.

11. In a flexible rule of the class described, a casing, a flexible tape wound within said casing, retracting means to retract said tape, automatically acting retarding means to control the retracting speed of said tape, said retarding means comprising an escapement rocker pivotally connected to said casing, said escapement rocker having an extending arm and a dash pot pivotally connected to the end of said arm and to said casing, an operating element operatively connecting the said tape and said retarding means, and release means for normally preventing retracting movement of said tape, said release means being displaceable to free said tape for movement.

12. In a flexible rule of the class described, a casing, a flexible tape wound within said casing, retracting means to retract said tape, automatically acting retarding means to control the retracting speed of said tape, said retarding means comprising a pair of diametrically opposed reciprocating dash pots bearing against the inner wall of said casing, said casing being of scalloped configuration in the path of travel of said dash pots, an operating element operatively connecting the said tape and said retarding means, and release means for normally preventing retracting movement of said tape, said release means being displaceable to free said tape for movement.

13. In a flexible rule, a casing, a tubular extension extending within said casing, a reel having a flexible tape wound thereon journaled on said extension, an operating element journaled axially of said reel, spring means for retracting said tape by rotating said reel, automatically acting braking means for retarding the retracting speed of said tape, said braking means being operatively connected to said reel through the intermediary of said operating element, said operating element comprising an annular shank having a ratchet wheel at one end and a pair of diametrically opposed pistons extending outwardly at the other end, and said braking means comprising a pair of cylinders fitted over said pistons and connected to each other for joint movement, said cylinders being positioned to abut the inner wall of said casing, said casing being scalloped whereby said cylinders will be reciprocated as said operating element is rotated under the influence of said spring means, said reciprocating cylinders serving to retard the speed of rotation.

MARK J. RYAN.

REFERENCES CITED

The following references are of record in the file of this patent:

UNITED STATES PATENTS

| Number | Name | Date |
|---|---|---|
| 310,603 | McDonald | Jan. 13, 1885 |
| 1,415,489 | Simpson | May 9, 1922 |
| 2,080,815 | Gasstrom | May 18, 1937 |
| 2,408,998 | Rhodes | Oct. 8, 1946 |